(12) United States Patent
Varfolomeev et al.

(10) Patent No.: US 11,112,047 B2
(45) Date of Patent: Sep. 7, 2021

(54) PIPE-IN-PIPE PIPELINES (71) Applicant: TECHNIP FRANCE, Courbevoie (FR)

(72) Inventors: Alexey Varfolomeev, Sandvika (NO);
Torgeir Kullerud Helland, Oslo (NO)

(73) Assignee: TECHNIP FRANCE ( * ) Notice: Subject to any disclaimer, the term of this patent is extended or adjusted under 35 U.S.C. 154(b) by 70 days.

(21) Appl. No.: 15/777,392

(22) PCT Filed: Nov. 16, 2016

(86) PCT No.: PCT/EP2016/077905
§ 371 (c)(1),
(2) Date: May 18, 2018

(87) PCT Pub. No.: WO2017/085147
PCT Pub. Date: May 26, 2017

(65) Prior Publication Data
US 2019/0072221 A1 Mar. 7, 2019

(30) Foreign Application Priority Data
Nov. 20, 2015 (EP) .................................... 15306844

(51) Int. Cl.
F16L 39/00 (2006.01)
F16L 1/20 (2006.01)

(52) U.S. Cl.
CPC ............ F16L 39/005 (2013.01); F16L 1/203 (2013.01); F16L 1/207 (2013.01)

(58) Field of Classification Search
None
See application file for complete search history.

(56) References Cited

U.S. PATENT DOCUMENTS 4,121,858 A 10/1978 Schulz ............................ 285/13
4,560,188 A 12/1985 Berti et al. ...................... 285/47
(Continued)

FOREIGN PATENT DOCUMENTS

FR 2 873 427 A1 7/2004
WO WO 2010/010390 A2 1/2010
(Continued)

OTHER PUBLICATIONS

International Preliminary Report on Patentability dated May 22, 2018 issued in corresponding International Patent Application No. PCT/EP2016/077905.
(Continued)

Primary Examiner — Matthew Troutman
Assistant Examiner — Douglas S Wood
(74) Attorney, Agent, or Firm — Ostrolenk Faber LLP (57) ABSTRACT A pipe-in-pipe (PIP) connector for use in a PIP pipeline for laying in a marine environment, the PIP pipeline including at least metal inner and outer pipes and an annular space thereinbetween, the connector including at least: (a) a first connector end including inner and outer longitudinal collars corresponding in circumference to the circumferences of the inner and outer pipes of the PIP pipeline, and weldable to a PIP pipeline, and (b) a second connector end including a machined portion configured to match and connect with a complementary portal or bore of an in-line subsea structure, and a coupling portion for coupling with a pipeline section, the coupling being decoupable.

18 Claims, 9 Drawing Sheets (56) References Cited

U.S. PATENT DOCUMENTS

| | | | | |
|---|---|---|---|---|
| 4,997,211 | A | 3/1991 | Brücher | 285/41 |
| 5,141,261 | A | 8/1992 | Ziu | 285/138 |
| 7,152,700 | B2 * | 12/2006 | Church | E21B 7/068 |
| | | | | 175/320 |
| 9,200,092 | B2 | 12/2015 | Hillesheim et al. | |
| 10,221,983 | B2 * | 3/2019 | Hoffmann | F16L 9/18 |
| 2003/0147699 | A1 | 8/2003 | Long et al. | 405/158 |
| 2005/0212285 | A1 * | 9/2005 | Haun | F16L 39/005 |
| | | | | 285/123.1 |
| 2008/0149210 | A1 | 6/2008 | Pionetti | 138/144 |
| 2008/0315578 | A1 | 12/2008 | Pionetti | 285/123.15 |
| 2011/0158748 | A1 | 6/2011 | Brocklebank et al. | 405/158 |
| 2012/0192985 | A1 | 8/2012 | Pionetti | 138/116 |

FOREIGN PATENT DOCUMENTS

| | | |
|---|---|---|
| WO | WO 2013/017280 A1 | 2/2013 |
| WO | WO 2013/021166 A1 | 2/2013 |

OTHER PUBLICATIONS

Search Report dated May 9, 2016 issued on corresponding European Patent Application No. 15306844.0.

\* cited by examiner

PIPE-IN-PIPE PIPELINES

CROSS-REFERENCE TO RELATED APPLICATIONS

The present application is a 35 U.S.C. §§ 371 national phase conversion of PCT/EP2016/077905, filed Nov. 16, 2016, which claims priority to European Patent Application No. 15306844.0, filed Nov. 20, 2015, the contents of which are incorporated herein by reference. The PCT International Application was published in the English language.

The present invention relates to a pipe-in-pipe (PIP) connector and a joining assembly for a PIP pipeline for laying in a marine environment, a PIP pipeline comprising one or more such connectors and/or joining assemblies, and methods of connecting an in-line subsea structure into such a PIP pipeline.

BACKGROUND TO THE INVENTION

PIP pipelines are well known in the art, and generally comprise an outer pipe and at least one, usually one, concentric or co-axial inner pipe. The inner pipe is used to transport or convey fluids such as hydrocarbons, in particular oil and gas, between two or more static and/or moveable locations, and can also be termed a flowline. This includes conveying fluids between vessels, or locations at or near a seabed such as an oil head, in particular a remote oil head, to an underwater facility and/or to a riser towards sea level, and/or directly to an onshore facility.

The outer pipe in the PIP pipeline generally provides protection, as well as an annular space between the inner and outer pipes for various reasons. These can include thermal insulation, as well as a number of items or accessories having a specific function. For example, they can be: longitudinal heating cables or other cables; transverse bulkheads for transferring mechanical loads between the outer pipe and the inner pipe: buckle arrestors to prevent the provocation of radial buckles; and water stops to avoid the ingress of water into a compartment defined between two water stops.

There are two common methods of laying underwater or marine pipelines. The 'stove piping method' involves assembling pipe stalks on a marine pipe-laying vessel, and then welding each one as the laying progresses. This method avoids bending the pipe stalks, but involves extensive offshore OPEX and time.

In the 'reeled lay method', the pipeline is assembled onshore from a number of stalks or sections, spooled onto a large reel, sometimes also termed a storage reel or drum. Once offshore, the pipeline is unwound from the reel and is directly available for laying through a lay ramp, with no stalk or section-welding being required during the offshore operation. As such, the reeled lay method is usually faster than the stove piping method, and the preferred laying procedure where possible in view of the time-critical nature of pipeline laying due to its CAPEX and OPEX.

To form the PIP pipeline for the reeled lay method, the stalks or sections are typically joined together directly, or joined together using suitable intermediate junction parts which must also be reelable. Simple intermediate junction parts are well known in the art, such as that shown in US2008/0315578 A1. U.S. Pat. No. 4,560,188 describes end pieces for a PIP joint which enable the location of additional thermally insulating material across the PIP joint.

Meanwhile, during a pipelaying operation it is commonly necessary to insert and attach in-line subsea structures at one or more end or intermediate locations along the pipeline. This requires interruption of the laying of the pipeline. Examples of such in-line structures are: initiation fittings, pipeline end terminations (PLETs), pipe valves, and T-pieces or T-assemblies, instrumented pipe sections such as flow monitoring equipment, and valves and branches such as in-line pipe valves, T-pieces, Y-pieces and/or associated assemblies.

Most if not all of the common in-line structures to be added are not 'reelable', (although WO 2013/021166 A1 describes a reelable T-piece preformer for subsequently forming a T-piece in a PIP pipeline during laying). Thus, the addition of most conventional in-line subsea structures still requires holding and cutting the PIP pipeline, and intensive work to insert and attach the in-line structure to an end or to each pipe of the fresh ends of the PIP pipeline, all such actions being offshore and taking time.

It is also sometimes desired to use a reeled PIP pipeline for multiple of different laying operations, or to extend a PIP pipeline beyond the length available on one reel. Such operations also conventionally require complex offshore PIP joining operations.

It is an object of the present invention to provide easier offshore PIP joining operations.

SUMMARY OF THE INVENTION

The present invention provides a pipe-in-pipe (PIP) connector for use in a PIP pipeline for laying in a marine environment, the PIP pipeline comprising at least metal inner and outer pipes and an annular space thereinbetween, the connector comprising at least:
 (a) a first connector end comprising inner and outer longitudinal collars corresponding in circumference to the circumferences of the inner and outer pipes of the PIP pipeline, and weldable to a PIP pipeline, and
 (b) a second connector end comprising a machined portion configured to match and connect with a complementary portal or bore of an in-line subsea structure, and a coupling portion for coupling with a pipeline section, said coupling being decoupable Optionally, the coupling portion of the second connector end is separate and has a greater diameter than the machined portion of the second connector end.

Optionally, the coupling portion of the second connector end is part of the machined portion of the second connector end.

Optionally, the outer longitudinal collar of the first connector end and the coupling portion of the second connector end have the same outer radius, and form a continuous outer shell that is in-line with the circumference of the outer pipe of the PIP pipeline.

Optionally, the inner longitudinal collar of the first connector end and the machined portion of the second connector end have the same inner radius, and form a continuous bore that is in-line with the bore of the inner pipe of the PIP pipeline.

Optionally, the outer circumferential radius of the inner longitudinal collar of the first connector end is less than the outer circumferential radius of the machined portion of the second connector end.

Optionally, the PIP connector comprises a neck between the outer longitudinal collar of the first connector end and the coupling portion of the second connector end, and the inner longitudinal collar of the first connector end and the machined portion of the second connector end.

Optionally, the PIP connector is for use in a reelable PIP pipeline.

The present invention provides a joining assembly for joining two pipe-in-pipe (PIP) sections of a PIP pipeline for laying in a marine environment, the PIP sections comprising at least metal inner and outer pipes and an annular space thereinbetween, the joining assembly comprising at least first and second pipe-in-pipe (PIP) connectors as defined herein, and a coupling between the coupling portions of the second connector ends of the first and second connectors, said coupling being decoupable.

Optionally, the coupling is one or more of the group comprising: mechanical fixings, welding, and one or more intermediate single-walled pipes.

Optionally, the coupling comprises at least one or more mechanical fixings, and the mechanical fixings comprise one or more of the group comprising: screws, bolts, clasps, clamps, pins, fasteners, and combinations of same.

Optionally, at least one of the mechanical fixings is integral with one or more of the first and second connectors.

Optionally, the coupling includes one or more girth welds.

Optionally, the coupling includes one or more intermediate single-walled pipes between the second connector ends of the first and second connectors.

Optionally, joining assembly further comprises a plurality of spacers externally on the joining assembly and on the outer pipe of the PIP pipeline on each side of the joining assembly.

The present invention provides a pipe-in-pipe (PIP) pipeline for laying in a marine environment comprising a plurality of PIP sections comprising at least metal inner and outer pipes and an annular space thereinbetween, and comprising one or more PIP connectors as defined herein, or one more joining assemblies as defined herein between two said PIP sections, or both.

Optionally, the PIP pipeline is a reelable pipeline.

Optionally, the PIP pipeline comprises at least one PIP connector or at least one joining assembly, or both, for the intended end-attachment or insertion during laying of one or more of the group comprising: initiation fittings, pipeline end terminations (PLETs), pipe valves, T-pieces, T-assemblies, instrumented pipe sections and Y-pieces.

Optionally, the PIP pipeline comprises at least one PIP connector or at least one joining assembly, or both, for the intended connection to another PIP section or PIP pipeline to form a longer PIP pipeline.

The present invention provides a method of connecting an in-line subsea structure to a pipe-in-pipe (PIP) pipeline for laying in a marine environment comprising at least metal inner and outer pipes and an annular space thereinbetween, the method comprising at least the steps of:
(i) providing the PIP pipeline having one or more PIP connectors as defined herein, or one more joining assemblies as defined herein between two said PIP sections, or both;
(ii) decoupling the coupling of at least one second connector end of a PIP connector to provide the machined portion of the PIP connector configured to match and connect with a complementary portal or bore of an in-line subsea structure; and
(iii) connecting the in-line subsea structure onto the machined portion of the PIP connector to connect the in-line subsea structure to the PIP pipeline.

Optionally, the PIP pipeline has one more joining assemblies as defined herein, and further comprising connecting the in-line subsea structure onto the machined portions of both second connector ends of the first and second connectors to connect the in-line subsea structure to the PIP pipeline.

Optionally, the PIP pipeline is a reelable pipeline, and the method further comprises the steps of:
reeling the PIP pipeline onto a reel, and
unreeling at least one of the PIP sections from the reel prior to decoupling the PIP connector.

Optionally, the method further comprises the step of adding a plurality of spacers externally on the outer pipe of the PIP pipeline on each side of the or each joining assembly prior to reeling the PIP pipeline onto a reel.

Optionally, the method comprises adding the plurality of spacers circumferentially around the outer pipe of the PIP pipeline on each side of the or each joining assembly prior to reeling the PIP pipeline onto a reel.

DESCRIPTION OF THE DRAWINGS

The invention can be better understood with reference to the following detailed description together with the appended illustrative drawings in which.

DETAILED DESCRIPTION OF THE DRAWINGS

The present invention broadly relates to a pipe-in-pipe (PIP) connector as discussed having one end with a machined portion configured to match and connect with a complementary portal or bore of an in-line subsea structure, and a coupling portion for coupling with a pipeline section, said coupling being decouplable. In this way, the so-formed PIP pipeline already includes at least one machined portion matched and configured to be connectable to an in-line subsea structure, which machined portion is easily available to the user during laying of the PIP pipeline, without having to cut the PIP pipeline itself to create a new or fresh entry point for an in-line subsea structure along the length of a PIP section during the laying operation.

In particular, the machined portion of the second connector end can be machined onshore. Optionally it can be formed separately to forming the PIP sections, to have the required precision to match and connect with a complementary entry point or end of an in-line subsea structure, termed herein as a 'portal or bore'. Such portals or bores are known in the art, and the time and effort to form a complementary connector end can be part of the onshore pre-laying effort, rather than during pipeline laying, where the daily OPEX is usually very high.

Thus, a benefit of the present invention is to reduce the offshore operations to only one or two PIP pipeline 'cuts', and one or two subsequent welds, compared to conventional in-line insertion of a subsea structure which requires welding of the outer pipe as well.

Generally, the PIP pipeline is formed of a number of PIP pipeline stalks or sections, commonly but not limited to, each having inner and outer metal pipeline sections of the same or similar length. The PIP sections, and hence the PIP pipeline, also comprise at least inner and outer concentric or co-axial metal pipes, having an annular space thereinbetween. The nature and dimensions and other parameters of the inner and outer pipeline sections can differ, generally due to the different purposes, as is well known in the art, and which is not further described herein.

Pipeline stalks or sections can be any length, commonly but not limited to, 12 m or 24 m. PIP pipelines, formed from multiple PIP sections, can be relatively short, such as under 1 km long, or be up to several kilometres or more long.

A PIP pipeline may include a less complex lead or tail section, sometimes also termed a 'lead string', intended purely for attachment or connection of the PIP pipeline to a drum or reel. Such lead or tail sections are typically single walled and sacrificial to the PIP pipeline being laid.

The present invention extends to a pipe-in-pipe (PIP) connector for use in a PIP pipeline between a PIP section and a lead or tail section.

In one embodiment of the present invention, the coupling portion of the second connector end is separate and has a greater diameter than the machined portion of the second connector end. In this way, the machined portion is separate from the coupling portion, and action concerning the coupling and decoupling of the coupling portion of the second connector end is separate or distinct from the machined portion. The machined portion can be kept free or distinct from the coupling portion, ready for use once the coupling has been decoupled and the machined portion is provided to the user.

Where the coupling between the coupling portion of the connector may alter in shape in any way during any reeling or unreeling step or process, then allowing the machined portion of the second connector end to be free or distinct from the coupling portion and coupling avoids any undesired alteration to the machined portion. In particular, it is possible during reeling or spooling of a PIP pipeline that some deformation of the usual circular nature of the outer pipe diameter is possible (due to the arcuate nature of reeling), but this does not affect the shape of the machined portion of the connector end, so that the machined portion is still exactly in its desired shape for matching and connection with a complimentary portal or bore of an in-line subsea structure.

Thus, a benefit of the PIP connector of the present invention is that the machined portion of the second connector end can have accurate dimensions compared to the ovality of a curved pipe, that make subsequent offshore welding very complex.

In an alternative embodiment of the present invention, the coupling portion of the second end is part of the machined portion of the at least one second connector end.

The PIP connector of the present invention can be designed and machined on a 'project by project' basis.

Optionally, the outer longitudinal collar of the first connector end and the coupling portion of the second connector end have the same outer radius, and form a continuous outer shell that is in-line with the circumference of the outer pipe of the PIP pipeline. In this way, the PIP connector can maintain the usually regular outer dimension and smooth outer surface of the PIP pipeline to maintain the optimum reelability of the PIP pipeline.

Optionally, the inner longitudinal collar of the first connector end and the machined portion of the second connector end have the same inner radius, and form a continuous bore that is in-line with the bore of the inner pipe of the PIP pipeline. In this way, the PIP connector can maintain the usually inner bore of the PIP pipeline to maintain the smooth passage of fluids therethrough in use.

Optionally, the outer circumferential radius of the inner longitudinal collar of the first connector end is less than the outer circumferential radius of the machined portion of the second connector end. In this way, the user has more material to achieve machining of the machined portion than the usual thickness of material of an inner pipe of a PIP section or pipeline, and the machined portion is less susceptible to any misshaping during reeling and unreeling.

The machined portion of the second connector end may be machined to be shaped or adapted to be connected with, or be complementary to, or to otherwise couple with, a particular in-line subsea structure, including but not limited to, having one or more faces, parts or apertures designed to and/or machined to match complementary faces, apertures and/or fixings of the in-line subsea structure.

The machining of the machined portion of the second connector end may include configuring the machined portion to include a threading, male or female locking portions, slots, grooves, apertures, etc. able to match and connect with a complementary portal or bore of an in-line subsea structure. In particular the machined portion may have a male or female GMC mechanical connector® shape, or a Merlin connector® shape, and be connected to a respective female or male connector of an in-line subsea structure using a dedicated press. The in-line subsea structure may have a conventional or unconventional entry or end, including a gate, door, or opening. The invention is not limited by the nature of the complementary portal or bore of the in-line subsea structure, as the machined portion of the second connector end is configured to match and connect therewith.

The in-line subsea structure includes pipeline end structures, and pipeline intermediate structures. The present invention is not limited by the nature, size or form of the in-line subsea structure. Examples of in-line subsea structures include, but are not limited to, one or more of the group comprising: initiation fittings, pipeline end terminations (PLETs), pipe valves, T-pieces, T-assemblies, in-line T-pieces (ILT), instrumented pipe sections such as flow monitoring equipment, and valves and branches such as in-line pipe valves, T-pieces, Y-pieces and/or associated assemblies.

Where the in-line subsea structure is an additional PIP section or PIP pipeline, the PIP pipeline can then be easily extended, especially during pipeline laying. For example, the PIP connector becomes a 'tie in' or 'intermediate tie in' between two PIP pipelines, for example where two (or more) reels or trips are required to achieve the overall desired PIP pipeline length.

As such, other examples of in-line subsea structures that can be included for the present invention include other or further PIP sections and PIP pipelines, generally as described herein and generally comprising least inner and outer concentric or co-axial metal pipes and having an annular space therebetween, and the present invention includes the use of two or more PIP connectors to form a PIP pipeline comprising two or more in-line subsea structures as defined herein.

Optionally, the pipe-in-pipe (PIP) connector comprises a neck between the outer longitudinal collar of the first connector end and the coupling portion of the second connector end, and the inner longitudinal collar of the first connector end and the machined portion of the second connector end. Optionally, the neck provides a complementary annulus portion to the annulus of the PIP pipeline.

Optionally, the pipe-in-pipe (PIP) connector is for use in a reelable PIP pipeline. That is, the so-formed PIP pipeline is assembled onshore and can be reeled or spooled onto a large reel, sometimes also termed a storage reel or drum. Once offshore, the PIP pipeline can then be unwound from the reel and is directly available for laying through a lay ramp or similar. Examples of reelable PIP pipelines are described in WO 2010/010390 A1.

The PIP connector may have any length, and is not limited to having an elongate length compared to their diameter or cross-dimensional size, or their ends. It is only a requirement of the PIP connector that it has a first connector end comprising inner and outer longitudinal collars corresponding in circumference to the circumference of the inner and outer pipes of the PIP pipeline, and that they can be weldable to another pipe or section, such as the ends of another PIP sections, and that they have a second connector end described hereinafter.

The nature, size and form of the first connector end of the PIP connector is not limited in the present invention, and the skilled man is aware of suitable sizes, shapes and forms to meet the ends of a PIP section.

A joining assembly of the present invention relates to joining two pipe-in-pipe (PIP) sections, and comprises at least first and second PIP connectors as defined herein, and a coupling between the coupling portions of the second connector ends of the first and second connectors, said coupling being decoupable.

The second connector ends of the first and second connectors in the joining assembly may be the same or different, and may vary in nature, shape and size depending upon the joining assembly required. At least one of second connector ends of the first and second connectors is machined to be connectable to an in-line subsea structure, as well as being able to form a coupling between the second connector ends to form the joining assembly of the present invention.

Where the PIP pipeline is a reelable pipeline, the so-formed PIP pipeline can be reeled onto a suitable reel for subsequent unreeling or unspooling in the reeled lay method as described herein.

The coupling between the second connector ends of the first and second connectors of the joining assembly is optionally one or more of the group comprising: mechanical fixings, welding, and one or more intermediate single-walled pipes.

Examples of suitable mechanical fixings include bolts and nuts, threaded portions within suitable apertures, and screws.

One or more parts of the mechanical fixings can be formed either as part of one of the first and second connectors, or added thereto either as a temporary or permanent addition, such as being welded to one or more ends or faces of a first and second connector in the form of a stud.

The coupling between the second connector ends of the first and second connectors may be by or include welding. That is, by the forming of one or more welds thereinbetween. Preferably, the welding comprises one or more girth welds.

The coupling between the second connector ends of the first and second connectors may include one or more intermediate single-walled pipes. That is, a single wall pipe is located between the second connector ends of the first and second connectors, and coupled thereto by any known mechanism such as welding.

In one particular embodiment of the present invention, there is provided a joining assembly as defined herein comprising at least:
  (a) first and second connectors as defined herein;
  (b) each of the second connector ends of the first and second connectors comprising a coupling portion, and a separate machined portion, the coupling portion having a greater diameter than the machined portion; and
  (c) a coupling between the coupling portions of the second connector ends of the first and second connectors being a welded intermediate single-walled pipe.

Optionally, the joining assembly of the present invention further comprises a plurality of spacers externally on the joining assembly and on the outer pipe of the PIP pipeline on each side of the joining assembly. The spacers can be to assist protecting the joining assembly from contacting other surfaces, especially if the joining assembly comprises any increase in diameter compared with the general diameter or outer surface dimension of the PIP pipeline. For example, the spacers may protect the joining assembly during reeling and unreeling of a PIP pipeline where the joining assembly must be reeled alongside previous coils of the PIP pipeline on a reel.

The present invention can provide a pipe-in-pipe (PIP) pipeline for laying in a marine environment. Preferably, the PIP pipeline of the present invention is a reelable pipeline. That is, the PIP pipeline is assembled onshore and can be reeled or spooled onto a large reel, sometimes also termed a storage reel or drum. Once offshore, the PIP pipeline can then be unwound from the reel and is directly available for laying through a lay ramp, lay tower, or similar.

The PIP pipeline may have a plurality of PIP connectors and/or joining assemblies as defined herein between neighbouring PIP sections, each connector and/or joining assembly being the same or different.

Optionally, the PIP pipeline comprises at least one PIP connector and/or at least one joining assembly for the intended end-attachment or insertion during laying of one or more of the group comprising: initiation fittings, pipeline end terminations (PLETs), pipe valves, T-pieces, T-assemblies, instrumented pipe sections and Y-pieces. In particular for the intended insertion during laying of an in-line T-piece (ILT), and optionally at least one other joining assembly for the intended insertion during laying of a PLET.

Alternatively or additionally, the PIP pipeline optionally comprises at least one PIP connector and/or at least one joining assembly for the intended connection to another PIP section or PIP pipeline. In this way, the PIP pipeline of the present invention may be used to form a longer PIP pipeline formed from two or more PIP pipelines joined by one or more joining assemblies as defined herein.

Thus, the present invention also extends to a PIP pipeline comprising a plurality of joining assemblies as defined herein able to combine two or more PIP pipelines, and to include as an intermediate or end structure one or more other in-line subsea structures as defined herein, such as a PLET or ILT.

In the present invention, the coupling is decoupable prior to laying of the PIP pipeline in a marine environment. For example, where the PIP pipeline is on a vessel, generally a pipe-laying vessel or barge, prior to the entry of the PIP pipeline into the water, the user is able to decouple the coupling at least one PIP connector, in order to connect the machined portion of the second connector end of the PIP connector to an in-line subsea structure.

In the present invention, the decoupling of the PIP connector may be carried out using any destructive or non-destructive step, steps, process or processes, so as to disconnect, disunite or otherwise separate the coupling from a PIP pipeline in order to connect the machined portion of the second connector end of the PIP connector to an in-line subsea structure. As the coupling is a secured coupling or connection between the PIP connector and the PIP pipeline intended to withstand the conditions of laying of the PIP pipeline in a marine environment, the decoupling may involve one or more of the group comprising: cutting, unlinking, 'unwelding', undoing, loosening, etc. of the secured coupling, using known apparatus or equipment. Optionally, the decoupling does not affect the machined portion of the second connector end.

Figure 1A:
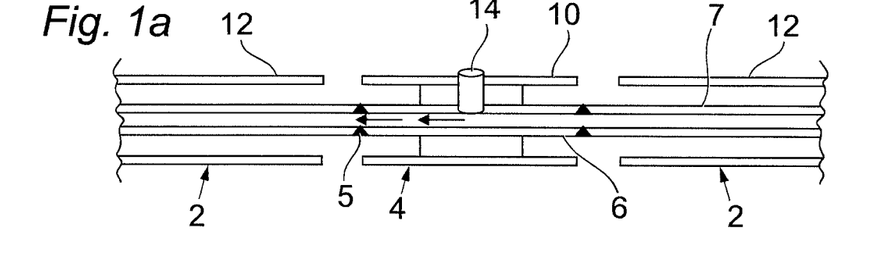
FIGS. 1a and 1b are prior art cross-sectional part-formed and fully formed PIP pipelines respectively, including a conventional T-piece.
Figure 1B:
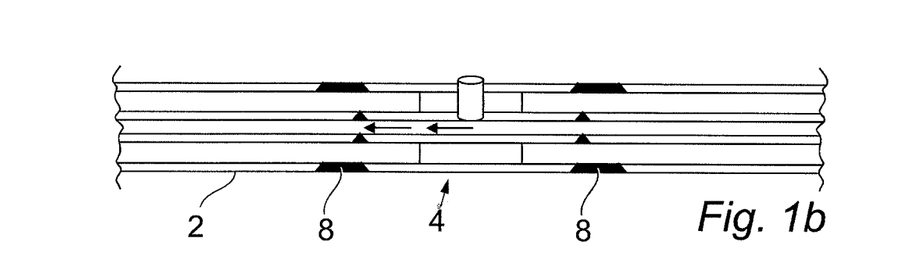

Referring to the drawings, FIGS. 1a and 1b herewith show a prior art PIP pipeline 2 having inner pipes 7 and outer pipes 12 into which it is desired to an a T-piece 4 during laying in a manner known in the art. The nature and shape of a conventional T-piece as shown in FIGS. 1a and 1b means that it cannot be added into the pipeline 2 as part of any on-shore assembly process as its injection nozzle 14 extends beyond the outer circumference of the pipeline 2.

Thus, the PIP pipeline 12 has been cut at a certain point along its length during the laying process to form the two separate PIP sections shown, to allow the insertion and connection of the T-piece 4 thereinbetween. The inner pipe 6 of the T-piece 4 is welded via welds 5 to the inner pipe 7 of one part of the pipeline 2, and then two outer shells 8 are provided and welded between the outer pipe 10 of the T-piece 4 and the outer pipes 12 of the pipeline 2 to create the connection and continuation of the pipeline 2. Once the welding is complete as shown in FIG. 1b, the laying of the pipeline 2 into a marine environment can continue.

It can be seen that the operations in FIGS. 1a and 1b require cutting of the PIP pipeline, machining and alignment of the inner pipes 7 with the T-piece inner pipes 6, two inner pipe welds (welds 5), the additional outer shells 8, and then the addition of the various outer welds, all causing time delay during the laying process.

Figure 2:
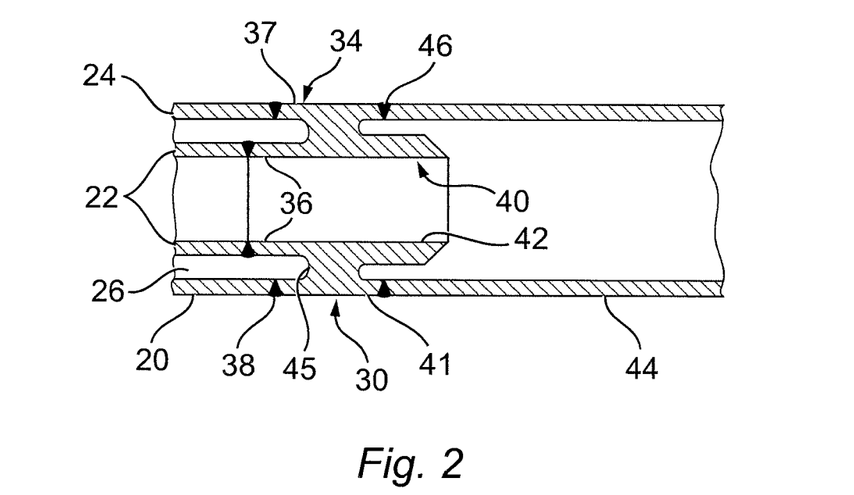
FIG. 2 is a cross-sectional view of a PIP connector on a PIP pipeline according to one embodiment of the present invention.

FIG. 2 shows an example of a PIP connector 30 for use in a PIP pipeline 20 for laying in a marine environment according to the present invention.

The end of the PIP pipeline 20 shown in FIG. 2 comprises a metal inner pipe 22 and metal outer pipe 24 and an annular space 26 thereinbetween. The inner pipe 22 may be formed from any steel, carbon steel, super martensitic stainless steel (SMSS), duplex, super duplex, and other corrosion resistant alloys. The inner pipe 22 may also be mono-metallic, or bi-metallic such as a metallurgically bonded clad pipe or a mechanically lined piped.

Optionally the inner pipe 22 and/or PIP connector 30 includes a clad/liner made from a corrosion resistant alloy, such as a solid CRA, typically 316, 825 and 625, or from a HDPE plastic liner. Any connection between metal liners would be through girth welds which would also be made of a corrosion resistant alloy.

Optionally, the outer pipe 24 is also formed from carbon steel, and it may be the same material as inner pipe 22.

Optionally, the inner pipe 22 has an inner diameter in the range 6 and 14 inches, and the outer pipe 24 has an inner diameter in the range 10 and 18 inches.

The PIP connector 30 can be made by a forged method, or by Hot Isostatic Pressing (HIP) method, and then machined for precision. The PIP connector 30 can be made of Carbon Steel, Carbon Steel with clad overlay welding, duplex and super duplex, and if required plastic.

Whilst the material of the PIP connector 30 and the PIP pipeline 20 could be different, they can also be chosen to be identical so that they will be easily welded, allowing corrosion to be controlled.

The PIP connector 30 has a first connector end 34 comprising an inner longitudinal collar 36 and an outer longitudinal collar 37, corresponding in circumference to the circumferences of the inner and outer pipes 22, 24 of the PIP pipeline, and welded to the ends of the two PIP sections 20 such as by girth weld 38.

The first connector 30 also has a second connector end 40. The second connector end 40 comprises a machined portion 42 configured to match and connect with a complementary portal or bore of an in-line subsea structure, and a coupling portion 41 for coupling with a pipeline section 44, said coupling being decoupable, as discussed hereinafter.

FIG. 2 shows the outer longitudinal collar 37 of the first connector end 34 and the coupling portion 41 of the second connector end 40 having the same outer radius, and forming a continuous outer shell that is in-line with circumference of the outer pipe 24 of the PIP pipeline 20. FIG. 2 also shows the inner longitudinal collar 22 of the first connector end 34, and the machined portion 42 of the second connector end 40 having the same inner radius, and forming a continuous bore that is in-line with the bore of the inner pipe 22 of the PIP pipeline 20. Between the outer longitudinal collar 37 and coupling portion 41, and the inner longitudinal collar 22 and the machined portion 42, there is a neck 45.

The coupling portion 41 of the second connector end 40 is coupled by a girth weld 46 to an intermediate single walled pipe 44, examples of which are discussed hereinafter.

Figure 3:
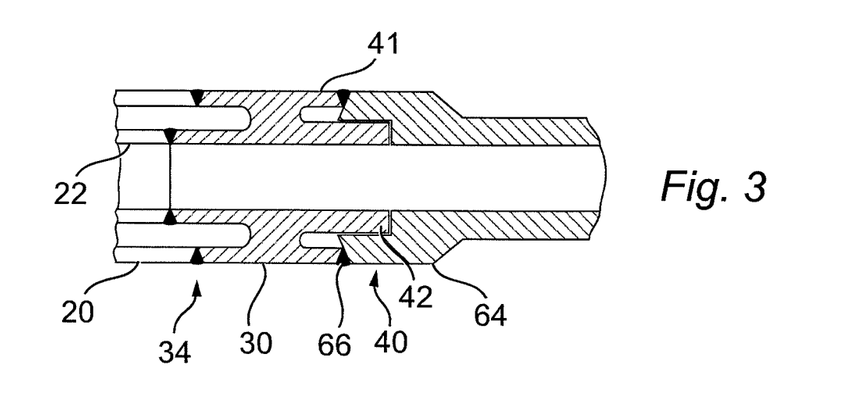
FIG. 3 is a cross-sectional view of a development of the PIP connector of FIG. 2 connected to a PLET.

FIG. 3 shows the PIP connector 30 of FIG. 2 realised from the intermediate single walled pipe 44, generally by release of the girth weld 46. FIG. 3 now shows the introduction of an end of an in-line subsea structure 64 onto the machined portion 42 of the second connector end 40 using an outer girth weld 66 with the coupling portion 41. Alternatively, the machined portion 42 could be welded directly to the in-line subsea structure, or a seal (not shown) could be added thereinbetween.

Figure 4:
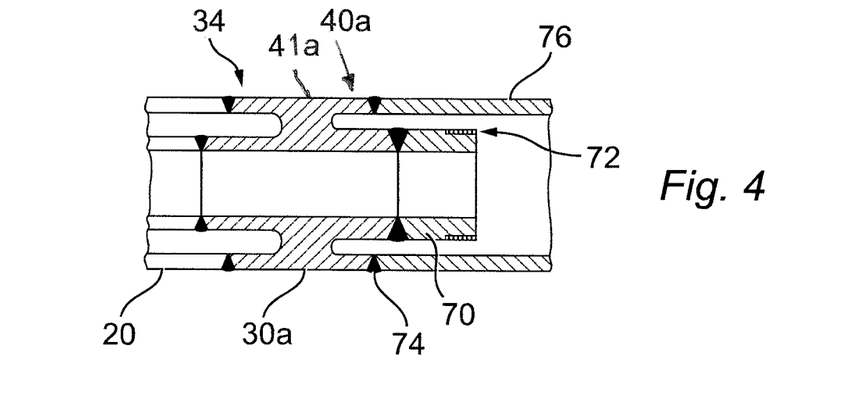
FIG. 4 is a modification of the PIP connector of FIG. 2

FIG. 4 shows another PIP connector 30a according to the present invention, having a first connector end 34 having inner and outer longitudinal collars corresponding in circumference to the circumferences of the inner and outer pipes of the PIP pipeline 20 shown in FIG. 2, and a second connector end 40a having a coupling portion 41a, and a machined portion being an inner collar 70 with an outer threaded portion 72. The PIP connector 30a has a coupling 74 to a single walled pipe 76 in the same or similar manner to that shown in FIG. 2.

The skilled man appreciates that the outer threaded portion 72 can in fact be any suitable mechanical interface, and may be located within or without the inner collar 70, or both, so as to provide a machined portion that can match and connect with a complementary portal or bore of an in-line subsea structure. The present invention is not limited by the nature of the machined portion, or the nature of the connection with the in-line subsea structure.

Figure 5:
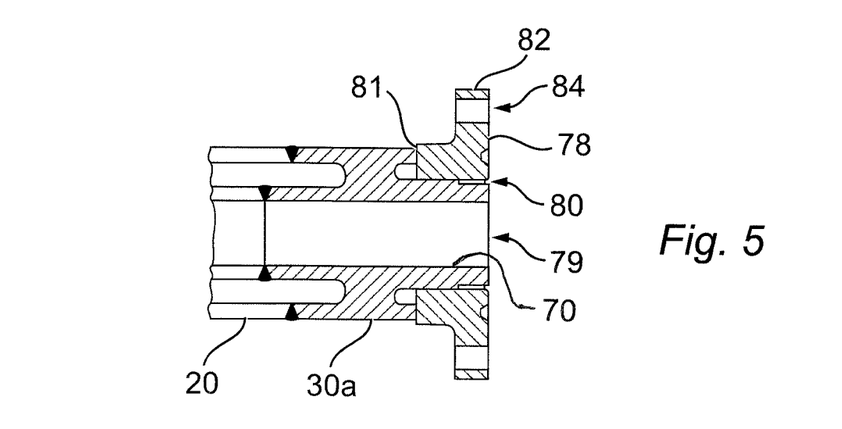
FIG. 5 is a cross-sectional view of a development of FIG. 4.

In use, the intermediate single walled pipe 76 shown in FIG. 4 is decoupled from the coupling portion 41a, such that the threaded portion 72 on the inner collar 70 is now available for use. FIG. 5 shows an in-line subsea structure 78 having an internal bore 79 with an internal complementary threaded portion 80, which can be coupled to the threaded portion 72 of the inner collar 70 of the PIP connector 30a for simple attachment thereinbetween, followed by the addition of one or more seals or welding 81. FIG. 5 also shows the in-line subsea structure 78 having a flanged portion 82 with apertures 84 to allow the direct mechanical linkage of the in-line subsea structure 78 to a suitable connection point on another unit or facility, e.g. a bulk head, for direct mechanical bolting thereto.

Figure 6:
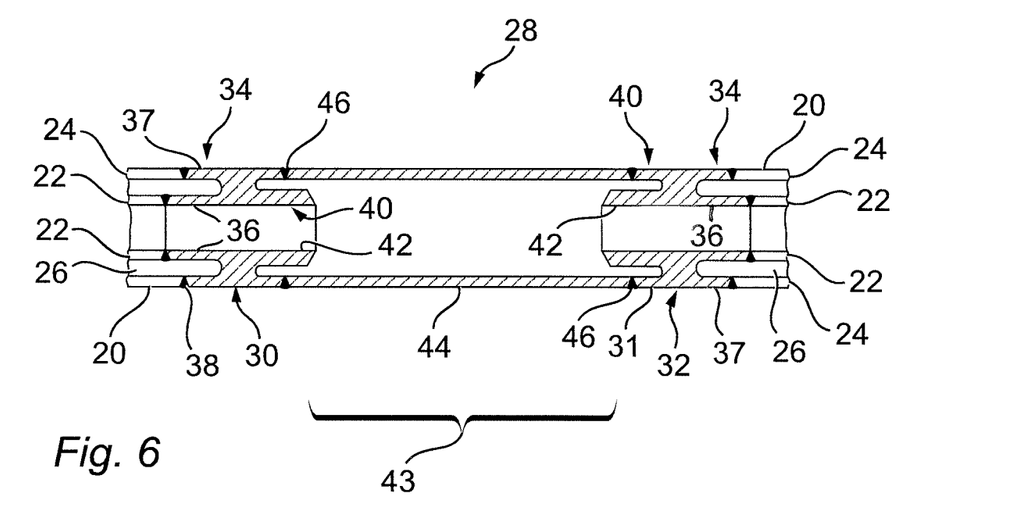
FIG. 6 is a cross-sectional view of a joining assembly for a PIP pipeline according to another embodiment of the present invention.

FIG. 6 shows a joining assembly 28 for joining two PIP sections 20 of a PIP pipeline for laying in a marine environment. The ends of the PIP sections 20 shown in FIG. 6 again comprise a metal inner pipe 22 and metal outer pipe 24 and an annular space 26 thereinbetween.

FIG. 6 uses two of the PIP connectors 30 shown in FIG. 2. The second connector 32 is similar to the first PIP connector 30, having a first connector end 34 comprising an inner longitudinal collar 36 and an outer longitudinal collar 37 corresponding in circumference to the circumferences of the inner and outer pipes 22, 24 of the PIP section 20, and welded to the end of the PIP section 20. The second PIP connector 32 also has a second connector end 40 configured to be connectable to an in-line subsea structure as discussed hereinafter.

Figure 8:
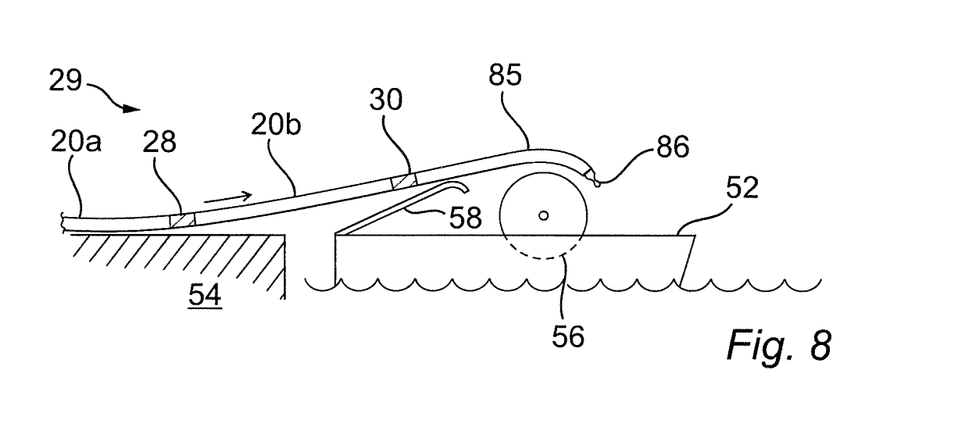
FIG. 8 is a schematic view of a first step of a method of connecting an in-line subsea structure into a PIP pipeline according to a further embodiment of the present invention.

Between the second connector ends 40 of the first and second connectors 30, 32 is a coupling 43, being an intermediate straight single-walled pipe 44, girth welded 46 at each end to the outer collars of the first and second connectors 30, 32. The coupling 43 provides the continuation of the PIP pipeline for subsequent reeling of the PIP pipeline as shown in FIG. 8 discussed hereinafter.

The intermediate straight single-walled pipe 44 could be connected to the PIP connectors 30, 32 by other means such as with threads. The length of the coupling 43 may be suitable to the specific pipeline. Optionally it is less than 10 m, but it may be up to 25 m or more. The intermediate straight single-walled pipe 44 could be formed from steel, such as carbon steel.

Figure 7:
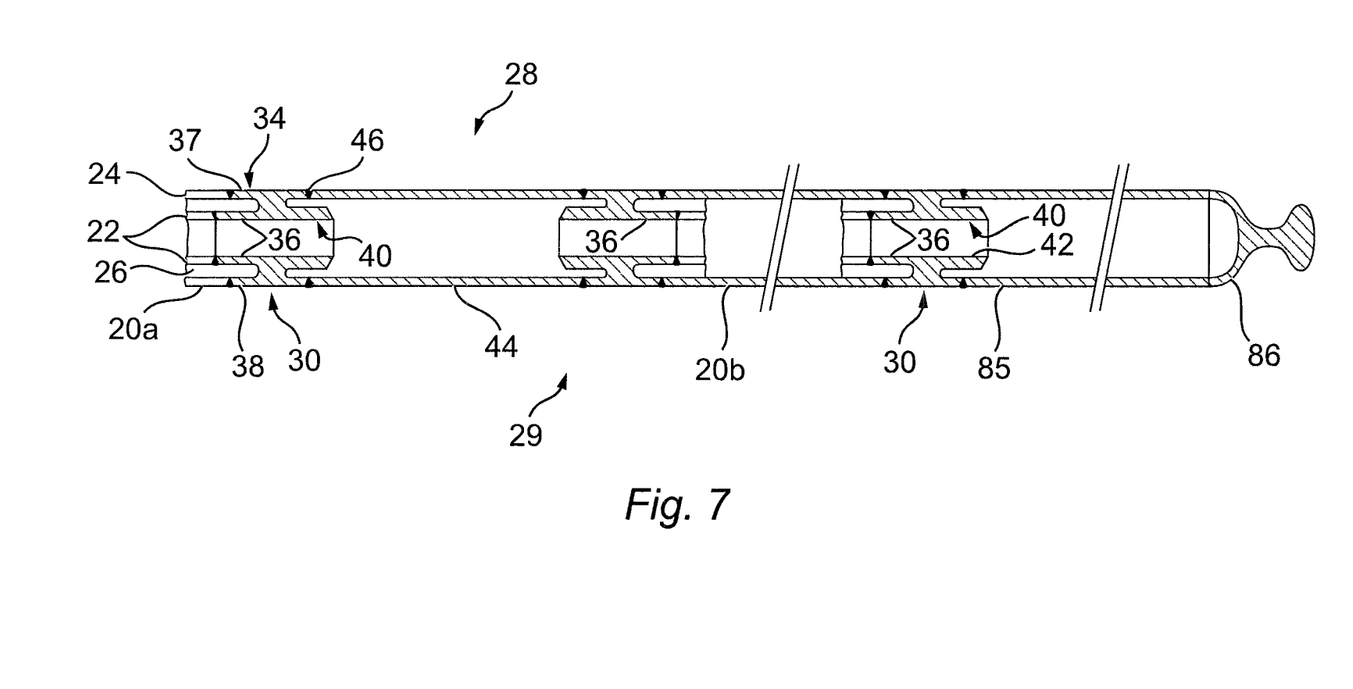
FIG. 7 is a cross-sectional view of a PIP pipeline according to another embodiment of the present invention.

FIG. 7 shows a PIP pipeline 29 comprising, from 'left to right', the end of a first PIP section 20a comprising inner and outer metal pipes 22, 24 in a manner described hereinbefore, a joining assembly 28 as described hereinbefore and shown in FIG. 6, a second PIP section 20b with similar inner and outer metal pipes, a PIP connector 30 as described herein and shown in FIG. 2, and a single walled lead string 85 capped by a pawn head 86.

Pawn heads 86 are known in the art, and can be used as easy attachment to other items in a pipeline reeling operation, such as the reel or drum on which the pipeline is to be reeled. Similarly, the lead string 85 is well known in the art as being a sacrificial simple pipeline piece at the front or end of a PIP pipeline.

The PIP pipeline 29 is a reelable pipeline having in-line PIP connectors with pre-prepared machined portions available for use as described hereinafter.

FIG. 8 shows the reeling of the PIP pipeline 29 from an onshore location 54 onto a pipe-laying vessel 52 over a laying ramp 58 and onto a reel 56. In a first alternative, the PIP pipeline 29 could be reeled onto a suitable laying vessel through a lay tower (not shown). In another alternative, the reel 56 is on-shore, and is subsequently located on a pipe-laying vessel 52 once the pipeline 29 is reeled thereon.

Figure 8A:
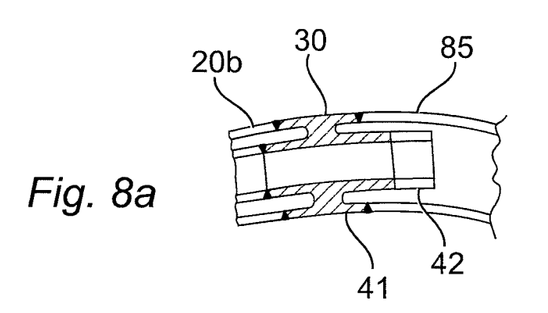
FIG. 8a is an enlarged cross-sectional view of a portion of the PIP pipeline being reeled in FIG. 8.

As shown in particular in FIG. 8a, the curving of the PIP pipeline 29 as it is spooled onto the reel 56 causes some bending and therefore likely ovality in the outer parts of the PIP pipeline 29. FIG. 8a shows curvature of the lead string 85 and the second PIP section 20b with a PIP connector 30 thereinbetween. However, it is a particular benefit of the present invention that the machined portion 42 of the second connector end 40 of the PIP connector 30 is not affected by the shaping of the portions around it, and in particular any curving of the coupling portion 41 of the PIP connector 30 as it adjusts to fit with the curvature of the lead string 85.

The skilled man can see that the same shape altering occurs during the reeling of all the PIP connectors 30, whether singularly or in duplicate as part of a joining assembly 28, both of which are shown in FIG. 7. Thus, the machine nature of the machined portion 42 is maintained in perfect form ready for matching and connecting with a complementary portal or bore of an in-line subsea structure.

Following reeling of the PIP pipeline 29 onto the reel 56 in FIG. 8, the pipe-laying vessel 52 travels to a pipe-laying site for laying of the pipeline 29 underwater 59.

Figure 9A:
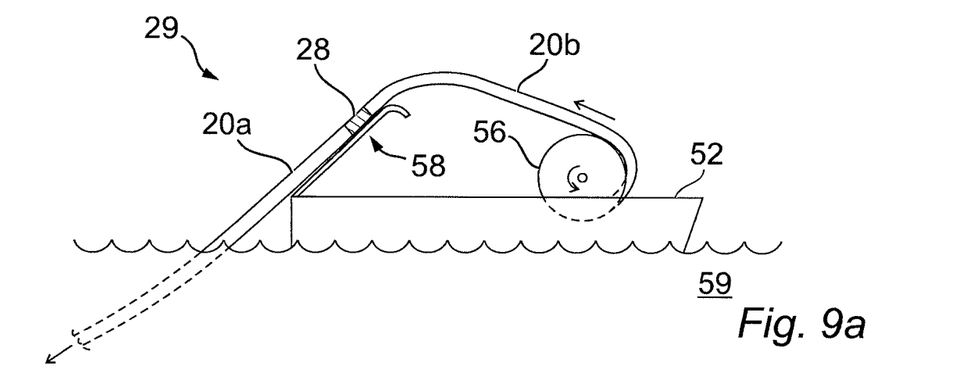
FIGS. 9a-9c are schematic views of further steps of the method of FIG. 8.

FIG. 9a shows the pipe-laying vessel 52 in an off-shore location, and laying the pipeline 29 under the water 59 from the reel 56 and over the laying ramp 58. Typically, the laying ramp 58 is raised during the laying operation.

Figure 9B:
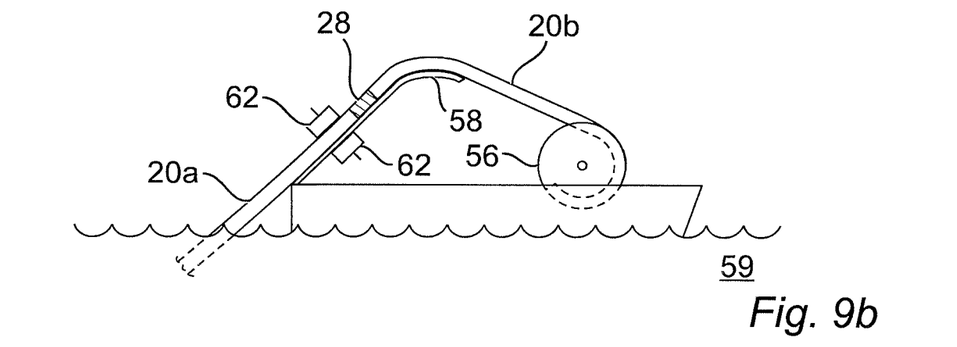

FIG. 9b shows the unreeling of the PIP sections 20a,b, and the location of the joining assembly 28 thereinbetween on the laying ramp 58. At this stage, it is intended to connect an in-line subsea structure, typically an In-line Tee (ILT), In-line Wye (ILY), any in-line monitoring equipment, subsea isolation vale (SSIV), into the PIP pipeline 29 prior to that portion of the PIP pipeline being laid into the water 59. Thus, FIG. 9b shows the step of providing the PIP pipeline 29 having a joining assembly 28 formed by first and second PIP connectors 30, 32, and a coupling 43 between two PIP sections 20.

FIG. 9b shows the use of locking clamps 62 being applied to the PIP section 20a below the coupling 43 in a manner known in the art, prior to decoupling the coupling 43 between the first and second PIP connectors 30, 32 to provide at least one machined portion of a connector configured to be connectable to an in-line subsea structure 60 (shown in FIG. 9c). The decoupling may be carried out by any suitable operation such as cutting, unwelding or loosening of any mechanical fixings, using known apparatus or equipment.

Figure 9C:
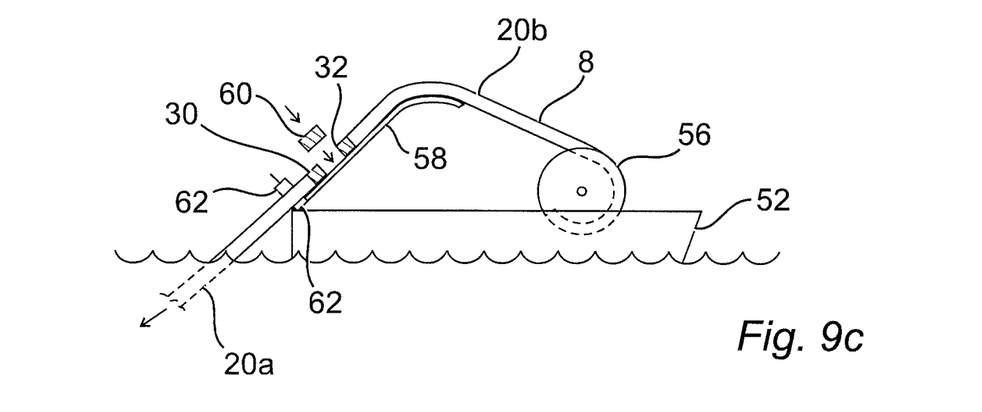

FIG. 9c shows the decoupled first PIP connector 30 on one PIP section 20a, and the second PIP connector 32 of another PIP section 20b, which can then be spaced appropriately (by operating the reel 56 and/or clamps 62) to provide sufficient space for the location of the in-line subsea structure 60 thereinbetween. The length of the coupling 43 could be the same as the in-line structure 60, or be different. After the pipeline 29 is secured in the clamp 62, the part of the pipeline 29 such as PIP section 20b attached to the reel can be either pushed down to reduce the distance between the PIP connectors 30, 32, or can be pulled back to increase the distance.

The in-line subsea structure 60 can then be connected onto at least one second connector end of the first and second connectors 30, 32 to connect the in-line subsea structure to at least one end of the PIP pipeline 29. For the methodology/cross-section presented in FIG. 4, the in-line/end line structure will be welded to the connector 30 on one or two sides. Other accompanying Figures represent other connector types which involves bolting, threads, gaskets etc.

For the example shown in FIG. 9c, it is intended for the in-line subsea structure 60 to be connected to the second connector ends of both the first and second PIP connectors 30, 32, such that after connection, there is a continuous or continuation of the PIP pipeline 29 for subsequent laying into the water 59.

In an alternative, the in-line subsea structure 60 may be a pipeline 'end fitting', such as a PLET, which is intended only to be connected to the second connector end of one of the first and second connectors 30, 32, usually the first connector 30, such that after connection, the PIP pipeline 29 is laid into the water 59, and the remaining PIP pipeline 29 on the reel 56 is ready for a separate laying operation.

In this way, any type of in-line subsea structure can be located and coupled into or onto a PIP pipeline during the laying process, without having to cut the PIP pipeline itself to create a new or fresh entry point. The present invention uses one or more connectors already adapted to be configured to be connectable to the in-line subsea structure for ease and swiftness of the coupling operation. Thus, any conventional in-line subsea structure, many if not most of which are generally of greater size and/or dimensions than the PIP pipeline, can be added prior to laying, whilst the PIP pipeline can still be formed on-shore and reeled onto a reel for laying in the reeled lay method.

Figure 10:
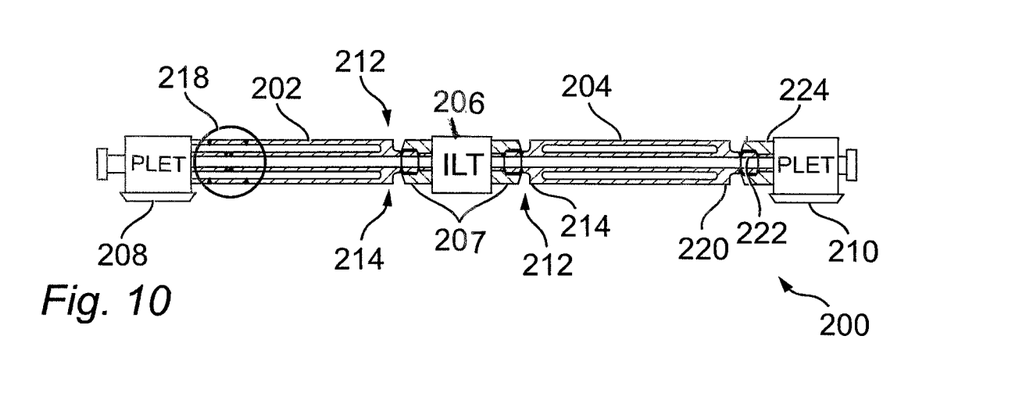
FIGS. 10-14 are examples of various PIP pipelines and in-line structures formable by the present invention.

FIGS. 10-14 show examples of the various PIP pipelines that can be formed from the present invention. FIG. 10 shows a PIP pipeline 200 having an intermediate in-line T-piece (ILT) 206 having complementary portals 207 able to be coupled with machined portions of second connector ends 212 of PIP connectors 214 located at the ends of first and second PIP sections 202, 204. At the other end of the PIP section 202 a PLET 208 is added based on a conventional welded half shell tie-in 218 known in the art. At the other end of the second PIP section 204 is another PIP connector 220 according to one embodiment of the present invention, and having a machined portion 222 configured to match and connect with a complementary portal 224 of a second PLET 210.

It can be seen that the pipeline 200 shown in FIG. 10 can be formed from the PIP pipeline 29 shown in FIG. 7 having the required joining assembly 28 that can be used to insert the ILT 206 between PIP sections 20a and 20b, and the separate PIP connector 30 having a second connector end 40 able to connect with the second PLET 210. Thus, the pipeline 200 shown in FIG. 10 can be provided from the PIP pipeline 29 shown in FIG. 7 by the decoupling of the single walled intermediate pipeline 44 and the decoupling of the lead string 85, to provide the free machined portions of the PIP connectors 30 shown in FIG. 7 available for the matching and connection of the ILT 206 and the second PLET 210, without the need to carry out any precision machining during laying of the PIP pipeline to match the PIP sections with the in-line subsea structures.

Figure 11:
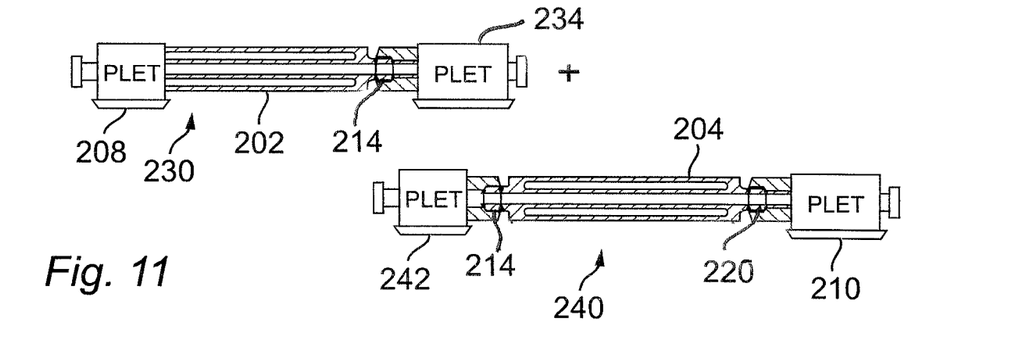

FIG. 11 firstly shows the provision of a first PIP pipeline 230 having at one end a PLET 208 conventionally welded, and at a second end a second PLET 234 that is connected via a PIP connector 214 in a manner shown in FIG. 10, to provide a PIP pipeline with PLETs 208, 234 at each end. FIG. 11 also shows a second PIP pipeline 240 comprising a PIP section 204 having a PIP connector 214 at one end to connect with a third PLET 242, and another PIP connector 220 at the other end to connect with a PLET 210 as shown in FIG. 10.

FIG. 11 illustrates the ability of the present invention to provide two separate PIP pipelines 230, 240 from a single reeled PIP pipeline 29 as shown in FIG. 7, by alternative use of the machined ends of the PIP connectors 214 to separate PLETs 234, 242. Thus, the same PIP pipeline 29 shown in FIG. 7 can provide different alternatives to the pipeline manufacture and operator, allowing flexibility of design and laying.

Figure 12:
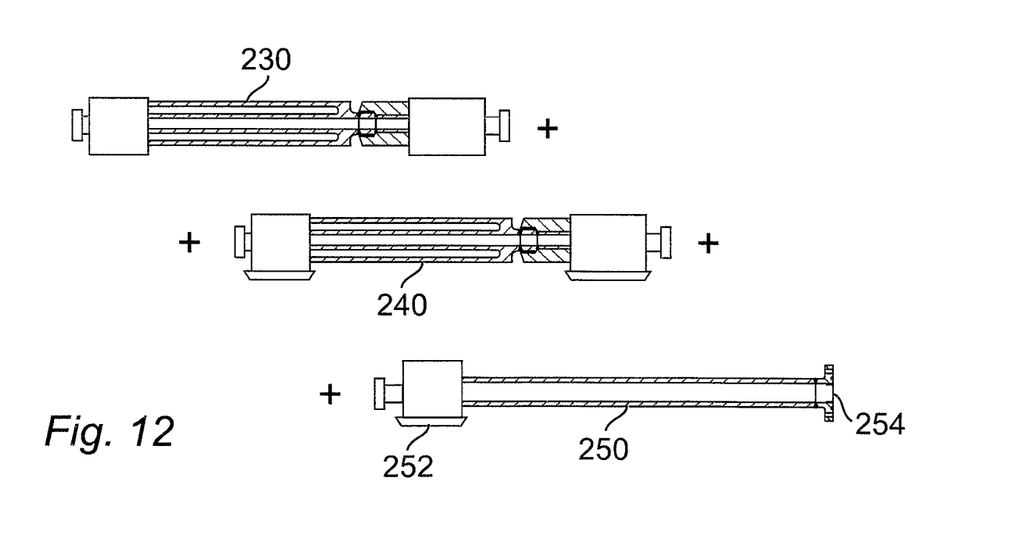

FIG. 12 shows a further variation available from use of the pipeline 29 shown in FIG. 7. In FIG. 12, the PIP pipeline 29 is, able to provide the first and second PIP pipelines 230, 240 shown in FIG. 11, along with the additional use of the lead string 85 to form a single line 250 between a PLET 252 and an end flange 254.

Figure 13:
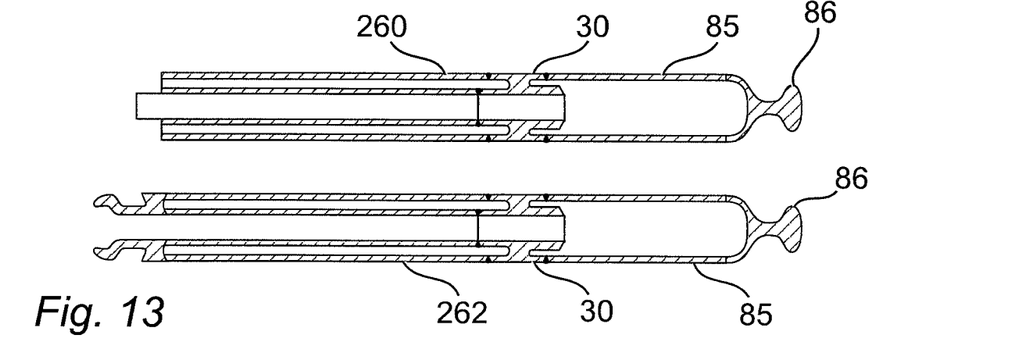

FIG. 13 shows a first PIP pipeline 260 that could be provided from a first reel (not shown), and a second PIP pipeline 262 which could be provided from a second reel (not shown). The first PIP pipeline 260 includes a PIP connector 30 as described herein, and a lead string 85 and a pawn head 86 in a manner described in relation to FIG. 7. The second PIP pipeline 262 also includes a PIP connector 30, and lead string 85 and a pawn head 86. The other end of the second PIP section 262 includes a ball type end connector configured to connect to the PIP connector of the first PIP pipeline 260.

Figure 14:
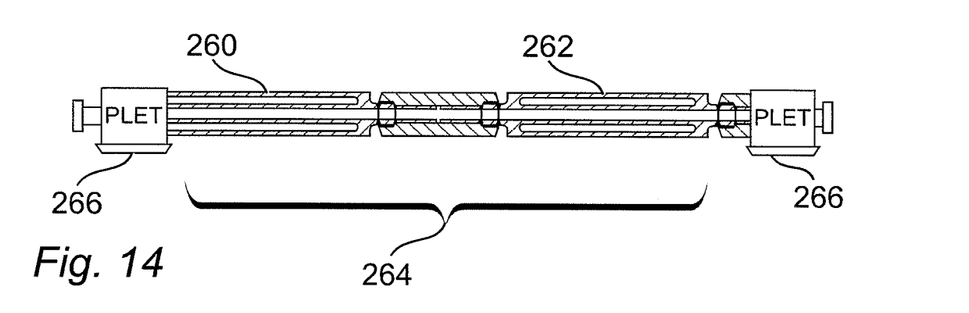

FIG. 14 shows the forming of a longer PIP pipeline 264 by the connection of the first and second PIP pipelines 260, 262 of FIG. 13, by the simple use of an intermediate tie-in therein between the end connector of the second PIP pipeline 262 and the last PIP connector 30 of the first PIP pipeline 260, and the addition of end PLETs 266 to complete the forming of the PIP pipeline 264. Thus, the PIP pipeline 264 can be provided from two different reels, or two different vessels trips from an onshore location, to provide an extended PIP pipeline with easy connection therein between in a manner described herein.

Figure 15:
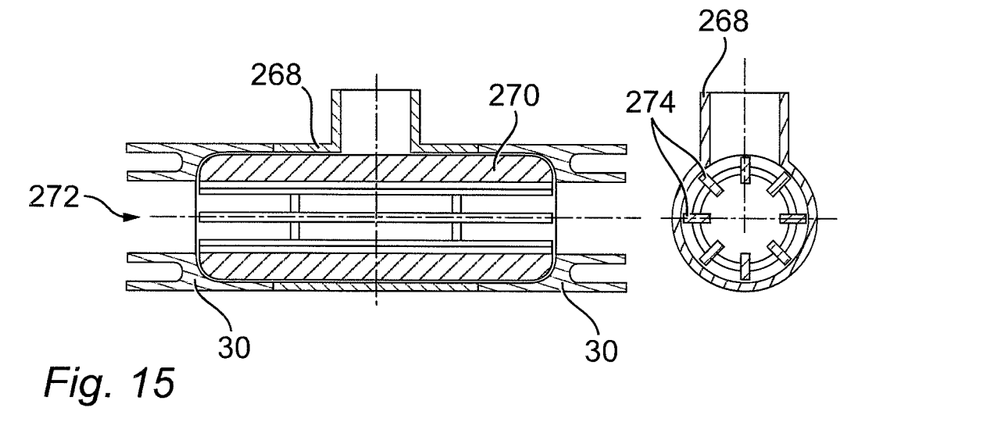
FIG. 15 comprises longitudinal and transverse cross-sectional views of a portion of an in-line subsea structure with a junction sleeve.

FIG. 15 shows two PIP connectors 30 as described herein, on each side of an in-line T-structure (ILT) 268, having a junction sleeve 270 through the bore of the ILT 268 and into the ends of the PIP connectors 30, so as to form a continuous bore 272 there through. The junction sleeve 270 comprises a series of vanes 274. Using several vanes to form the sleeve allows the passage of a 'PIG' during inspection operations, whilst it also allows a constant flow of hydrocarbons such as oil between the blades during production. The vanes prevent stagnation of hydrocarbons between the sleeve and the in-line subsea structure or connectors, which can lead to bacterial corrosion.

Figure 16:
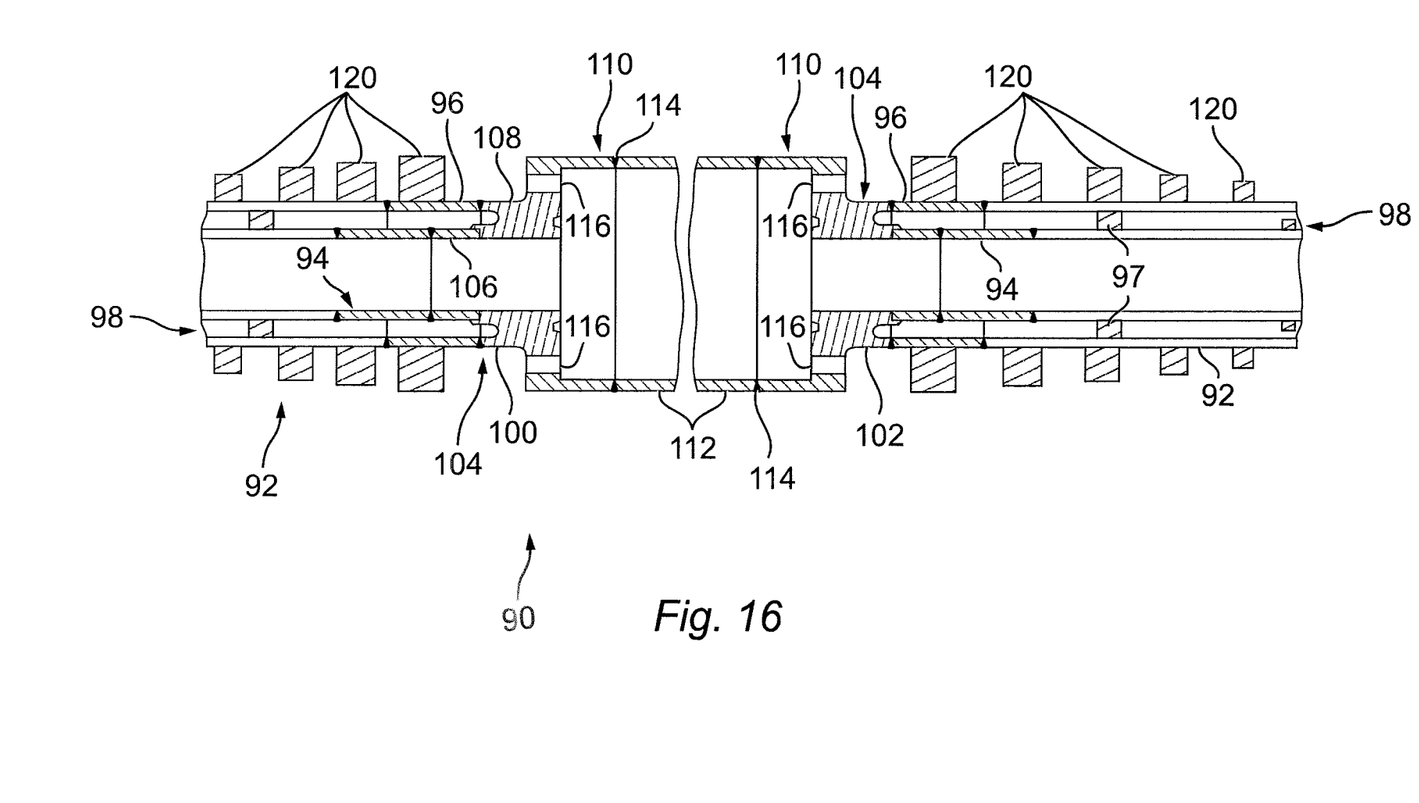
FIG. 16 is a cross-sectional view of a further joining assembly according to another embodiment of the present invention.

FIG. 16 shows another joining assembly for PIP sections of a PIP pipeline according to the present invention. The two PIP sections 92 comprise metal inner and outer pipes 94, 96 respectively and an annular space 98, and first and second PIP connectors 100, 102 respectively, each having a first connector end 104 (comprising inner and outer longitudinal collars 106, 108 respectively welded to the ends of the two PIP sections 92), and second connector ends 110, wherein the coupling portions are part of the machined portions. Between the second connector ends 110 of the first and second PIP connectors 100, 102 is an intermediate single walled pipe 112 welded at each end 114 to the second connector ends 110 to create a continuation of the PIP pipeline sections 92.

The first and second PIP connectors 100, 102 include apertures 116 suitable for the insertion of bolts therethrough for direct mechanical connection to a suitable complementary face of an in-line subsea structure (not shown). These apertures 116 are in intermediate transverse wall portions of the first and second PIP connectors 100, 102, such that the second connector ends 110 have a greater diameter or outer circumference than the first connector ends 104, in particular greater than the outer collars 108 of the first connector ends 104 and the outer pipes 96 of the PIP sections 92. Thus, a series of circumferential spacers 120 or rings are located along the outer pipes 96 of the PIP sections. The spacers 120 having increasing width (or height as shown) as they approach the joining assembly 90. The spacers provide a graduation in the 'outer dimension' of the PIP sections 92 towards the outer dimension of the joining assembly 90 in a smoother transition zone or portion of the outer pipes 96, to avoid an otherwise sudden change in the outer dimension of the PIP pipeline across the joining assembly 90 shown in FIG. 16. This assists the reeling and accommodation of the joining assembly 90 onto the reel next to the PIP pipeline and its more general outer dimension of its outer pipe 96.

Typically the spacers 120 can be made of a polymer, such as a Nylon product. Alternatively the spacers 120 can be formed from any type of coating or wrapped material, which can withstand loads associated with reeling. The spacers 120 may be formed in two halves bolted on, but could be formed as rings that are 'slided' on.

Generally the spacers 120 nearest on the joint assembly 90 have an outer diameter bigger than the maximum circumscribed circle diameter, and the outer diameter dimension of the spacers 120 decreases or tapers so that they are within a cone with an opening angle lesser than 60°. Typically there are spacers 120 every 1 meter or more along the outer piper pipes.

FIG. 16 also shows a number of PIP centralizers 97 positioned near the connector to reduce local strains on welds etc.

Figure 17:
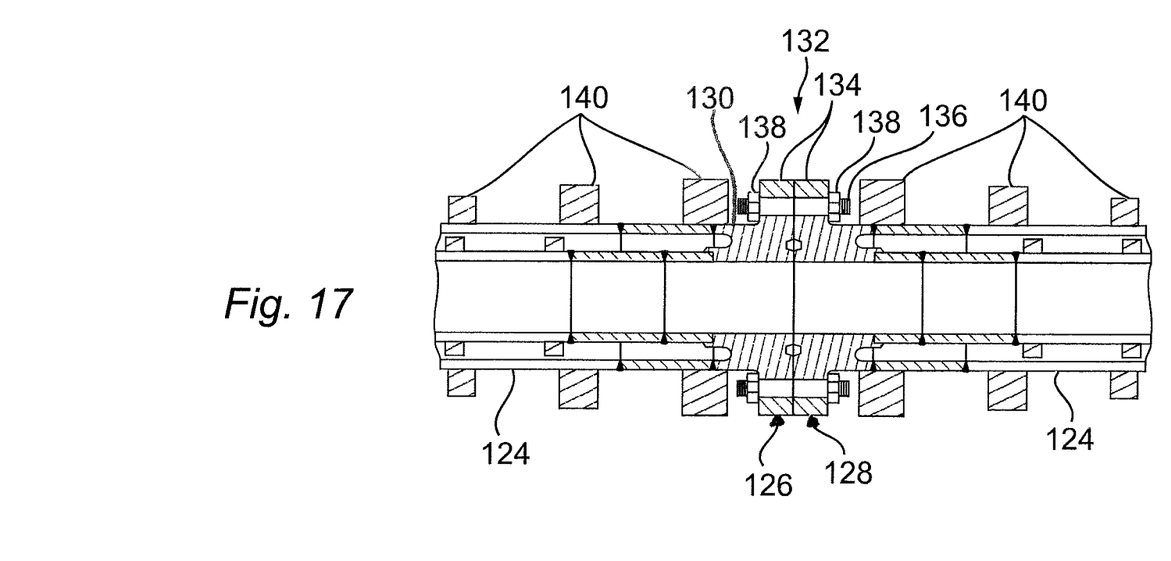
FIG. 17 is a cross-sectional view of a further joining assembly according to another embodiment of the present invention.

FIG. 17 shows another joining assembly according to the present invention, comprising the ends of two PIP sections 124 and first and second PIP connectors 126, 128 respectively, each having a first connector end 130 welded to the end of the PIP section 124 in a manner described hereinbefore, and a second connector end 132 comprising a flanged portion 134 providing a combined coupling portion and machined portion. The flanged portions 134 each housing an aperture through which a bolt 136 can be journaled and fastened by nuts 138 at each end to couple the first and second PIP connectors 126, 128 together in a quick and easy manner. In a similar manner to that shown in FIG. 16, spacers 140 of increasing width are located along the outer pipes of the PIP sections 124, and optionally around a part of the first and second PIP connectors 126, 128, in order to gradually increase the outer dimension of the PIP sections 124 as they approach the joining assembly, and to create an outer dimension of the which is the same or similar to the outer dimension of the joining assembly, to protect the joining assembly during reeling of the PIP pipeline.

Decoupling of coupling shown in FIG. 17 may be carried out by loosening the nuts 138 and removal of the bolts 136, such that the second ends 132, which have been machined, are ready to be connected to a suitable complementary end of an in-line subsea structure (not shown).

Figure 18:
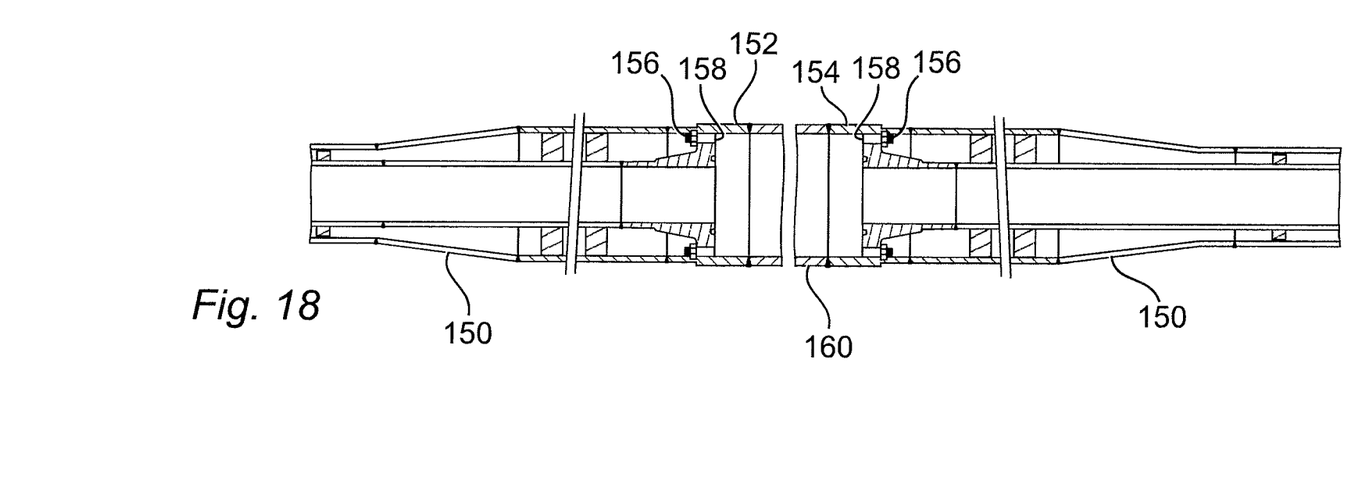
FIG. 18 is a cross-sectional view of a further joining assembly according to a further embodiment of the present invention.

FIG. 18 shows another joining assembly between PIP sections 150 of a PIP pipeline comprising first and second PIP connectors 152, 154 welded to the ends of the two PIP sections 150, and pre-installed nuts 156 at the ends of apertures 158 in flanged portions of the first and second PIP connectors 152, 154. The joining assembly comprises a coupling being an intermediate single walled pipe 160 which can be decoupled from one or both of the first and second PIP connectors 152, 154 to leave at least one of the second connector ends of the first and second connectors 152, 154 able to be connected to an in-line subsea structure. In the arrangement shown in FIG. 18, the in-line subsea structure may include one or more threaded bolts or studs, able to be directly connected to the nuts 156 in the first and second PIP connectors 152, 154, increasing the ease and speed of connection of an in-line subsea structure to the PIP sections 150.

The skilled man can see that many variations are possible in the present invention of the nature of the PIP connector and the joining assembly, which are suited to providing a machined portion of a second connector end being available for connection to an in-line subsea structure. By having one coupling end configured to be connectable to an in-line subsea structure, the operator during laying of the PIP pipeline has a simple operation to provide a convenient point of entry for an in-line subsea structure, and indeed then connect the in-line subsea structure to the PIP section either as an end piece such as PLET, or for continuation of the PIP pipeline during laying. This allows a quicker and convenient method of adding conventional in-line subsea structures into the PIP pipeline during laying, and in particular during laying of a reelable PIP pipeline.

The invention claimed is:

1. A method of connecting an in-line subsea structure to a pipe-in-pipe (PIP) pipeline for laying in a marine environment, the PIP pipeline comprising a plurality of PIP pipeline sections, each PIP pipeline section of the plurality of PIP pipeline sections having at least metal inner and outer pipes and an annular space thereinbetween, the PIP pipeline having one or more PIP connectors, a first PIP pipeline section of the plurality of PIP pipeline sections and a second PIP pipeline section of the plurality of pipeline sections being connected to one another with a PIP connector from the one or more PIP connectors, the PIP connector having a first connector end and a second connector end, the first connector end comprising inner and outer longitudinal collars corresponding in circumference to the circumferences of the inner and outer pipes of the first PIP pipeline section, and welded to the first PIP pipeline section, and the second connector end comprising a machined portion configured to match and connect with a complementary portal or bore of the in-line subsea structure, and a coupling portion coupled to the second PIP pipeline section, said coupling being decoupable from the second PIP pipeline section, the method comprising at least the steps of:

(i) providing the PIP pipeline;
(ii) decoupling the coupling portion that is at the second connector end of the connector and coupled to the second PIP pipeline section to provide the machined portion of the PIP connector that is configured to match and connect with the complementary portal or bore of the in-line subsea structure; and (iii) connecting the in-line subsea structure onto the machined portion of the PIP connector to connect the in-line subsea structure to the PIP pipeline,
wherein the in-line subsea structure is a pipeline end structure or a pipeline intermediate structure that is located at a subsea location.

2. The method as claimed in claim 1, further comprising connecting the in-line subsea structure onto the machined portions of both second connector ends of the first and second connectors to connect the in-line subsea structure to the PIP pipeline.

3. The method as claimed in claim 1, wherein the PIP pipeline is a reelable pipeline, and further comprising the steps of: reeling the PIP pipeline onto a reel, and unreeling at least one of the PIP sections from the reel prior to decoupling the PIP connector.

4. The method as claimed in claim 3, further comprising the step of adding a plurality of spacers externally on the outer pipe of the PIP pipeline on each side of the or each joining assembly prior to reeling the PIP pipeline onto a reel.

5. The method as claimed in claim 4, further comprising adding the plurality of spacers circumferentially around the outer pipe of the PIP pipeline on each side of the or each joining assembly prior to reeling the PIP pipeline onto a reel.

6. A method as claimed in claim 1, wherein the coupling portion of the second connector end is separate and has a greater diameter than the machined portion of the second connector end.

7. A method as claimed in claim 1, wherein the coupling portion of the second connector end is part of the machined portion of the second connector end.

8. A method as claimed in claim 1, wherein the outer longitudinal collar of the first connector end and the coupling portion of the second connector end have the same outer radius, and form a continuous outer shell that is in-line with the circumference of the outer pipe of the PIP pipeline.

9. A method as claimed in claim 8, wherein the inner longitudinal collar of the first connector end and the machined portion of the second connector end have the same inner radius, and form a continuous bore that is in-line with the bore of the inner pipe of the PIP pipeline.

10. A method as claimed in claim 9, wherein the outer circumferential radius of the inner longitudinal collar of the first connector end is less than the outer circumferential radius of the machined portion of the second connector end.

11. A method as claimed in claim 8, comprising a neck between the outer longitudinal collar of the first connector end and the coupling portion of the second connector end, and the inner longitudinal collar of the first connector end and the machined portion of the second connector end.

12. A method as claimed in claim 1, wherein the coupling includes one or more girth welds.

13. A method as claimed in claim 1, wherein the PIP pipeline has one or more joining assemblies comprising a second connector end comprising a machined portion configured to match and connect with a complementary portal or bore of an in-line subsea structure, and a coupling portion for coupling with a pipeline section, said coupling being decoupable, and further comprising connecting the in-line subsea structure onto the machined portions of both second connector ends of the first and second connectors to connect the in-line subsea structure to the PIP pipeline.

14. A method as claimed in claim 1, wherein the PIP pipeline is a reelable pipeline comprising a number of PIP sections, and further comprising the steps of:
reeling the PIP pipeline onto a reel (56), and
unreeling at least one of the PIP sections from the reel prior to decoupling the PIP connector.

15. A method as claimed in claim 1, further comprising the step of adding a plurality of spacers externally on the outer pipe of the PIP pipeline on each side of the or each joining assembly prior to reeling the PIP pipeline onto a reel.

16. A method of connecting an in-line subsea structure to a pipe-in-pipe (PIP) pipeline for laying in a marine environment comprising at least metal inner and outer pipes and an annular space thereinbetween, the method comprising at least the steps of:
(i) providing the PIP pipeline having one more joining assemblies, each joining assembly comprising at least first and second PIP connectors, and a coupling between coupling portions of second connector ends of the first and second PIP connectors, each said coupling coupling two PIP pipeline sections of the PIP pipeline, and being decoupable to decouple the two PIP pipeline sections;
(ii) decoupling the coupling of at least one second connector end of a PIP connector to provide a machined portion of the PIP connector configured to match and connect with a complementary portal or bore of the in-line subsea structure; and
(iii) connecting the in-line subsea structure onto the machined portion of the PIP connector to connect the in-line subsea structure to the PIP pipeline,
wherein the in-line subsea structure is a pipeline end structure or a pipeline intermediate structure that is located at a subsea location.

17. A method as claimed in claim 16, wherein the coupling portion of the second connector end is separate and has a greater diameter than the machined portion of the second connector end.

18. A method as claimed in claim 16, wherein the coupling portion of the second connector end is part of the machined portion of the second connector end.

* * * * *